Figure 1:
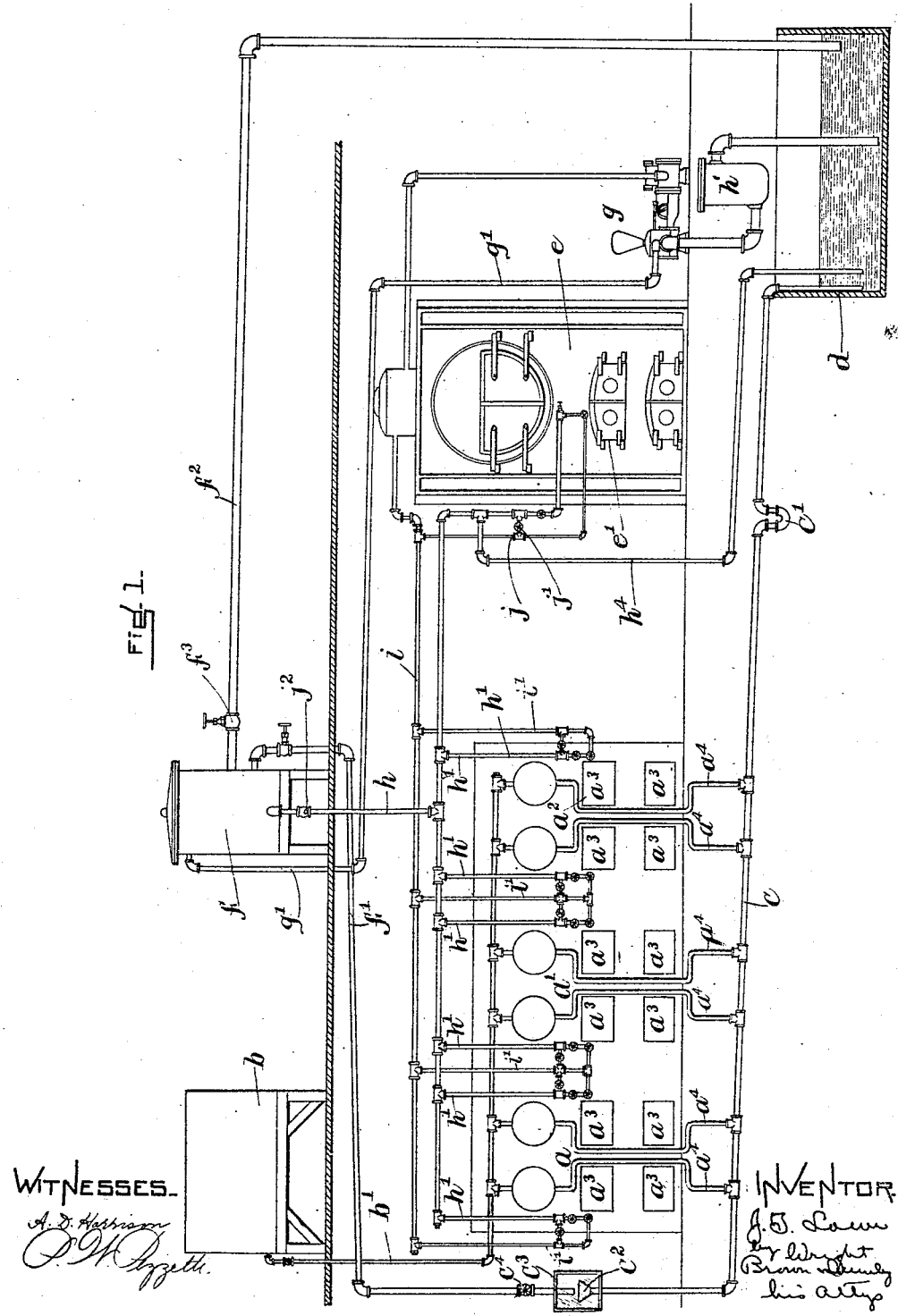

No. 708,510. Patented Sept. 2, 1902.
J. T. LOWE.
PROCESS OF TREATING GAS TAR RESIDUUM.
(Application filed Jan. 21, 1901.)
(No Model.) 2 Sheets—Sheet 1.

WITNESSES. INVENTOR.

No. 708,510. Patented Sept. 2, 1902.
J. T. LOWE.
PROCESS OF TREATING GAS TAR RESIDUUM.
(Application filed Jan. 21, 1901.)
(No Model.) 2 Sheets—Sheet 2.
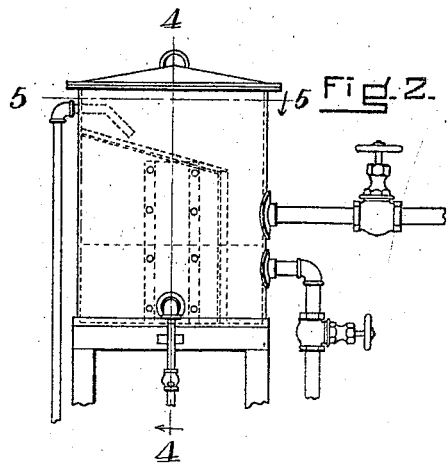
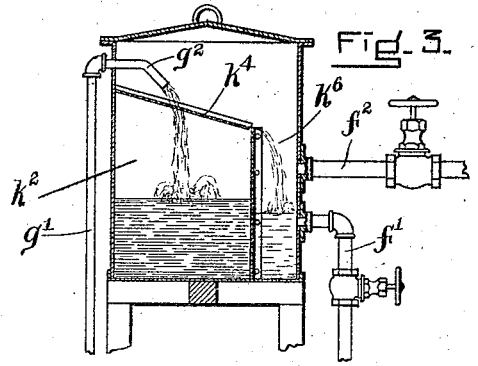
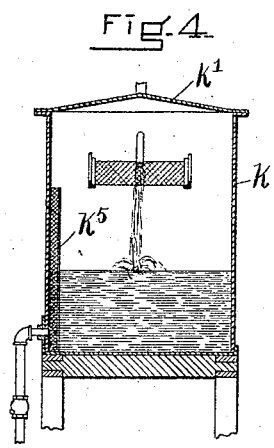
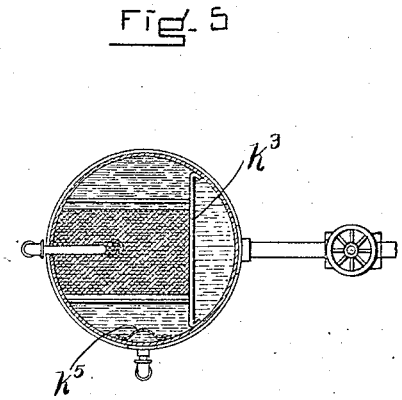
WITNESSES.
INVENTOR.

UNITED STATES PATENT OFFICE.

JOHN T. LOWE, OF BOSTON, MASSACHUSETTS, ASSIGNOR OF TWO-THIRDS TO MILTON P. McLAUGHLIN, OF SOMERVILLE, AND JOSEPH N. SMITH, OF WOLLASTON, MASSACHUSETTS.

PROCESS OF TREATING GAS-TAR RESIDUUM.

SPECIFICATION forming part of Letters Patent No. 708,510, dated September 2, 1902.

Application filed January 21, 1901. Serial No. 44,108. (No specimens.)

*To all whom it may concern:*

Be it known that I, JOHN T. LOWE, of Boston, in the county of Suffolk and State of Massachusetts, have invented certain new and useful Improvements in Processes of Treating Residuum, of which the following is a specification.

Figure 1 represents, more or less conventionally, a plant equipped with my invention. Figs. 2, 3, 4, and 5 represent a device for separating the water from the residuum.

Much difficulty has hitherto been experienced in the manufacture of what is known as "Pintsch gas" in disposing of the residuum of tar. In plants for the manufacture of this gas the tar is permitted to escape from the retorts into a conduit, from whence it is carried to a suitable receptacle. The consistency of the tar varies according to the temperature of the atmosphere and according to varying conditions, so that at times it is difficult to remove the tar prior to its hardening in the conduit. In order to obviate this difficulty, I provide for a stream of water flowing through the conduit, so as to flush it out, a relatively small quantity of water serving for this purpose. By thus employing the water the tar is carried away through the conduit to a proper receptacle of a practically uniform consistency before it has had an opportunity to cake or harden. The presence of the large body of water in the tar, however, renders it difficult to burn the latter, and hence in order to render the latter readily combustible I provide means for separating the water from the tar.

Referring to the accompanying drawings, and more particularly to Fig. 1, $a$ $a'$ $a^2$ represent a plurality of pairs of retorts arranged as indicated. They do not differ from those ordinarily employed in the manufacture of Pintsch gas, oil being carried to them from a tank $b$ by means of a pipe $b'$, having branches as indicated.

$a^3$ indicates the fire-box of each retort, and $a^4$ indicates the pipe for conducting the tar from its retort to the conduit therefor. The said conduit is indicated conventionally as consisting of a large pipe $c$, formed with a trap $c'$, and discharging into a tank $d$. This conduit is inclined, so that the tar and water will run therethrough to the tank $d$. I have not indicated the gas mains or conduits, as they form no part of my invention.

$e$ indicates a boiler-furnace having a fire-box $e'$, said furnace being for the purpose of supplying steam for the injection of the tar into the fire-boxes of the retorts and of the furnace itself.

$f$ indicates the separator which separates the water from the oil, the mixed oil and water from the tank $d$ being forced up to it through a pipe $g'$.

$h^{10}$ indicates a strainer interposed between the pump and the tank $d$, through which the mixed tar and water are drawn to remove foreign matter. The water passes from the separator $f$ through a pipe $f'$ and is discharged into the funnel-shaped end $c^2$ of the conduit $c$. A box $c^3$, having a glazed side, incloses the funnel $c^2$ and the end of the pipe $f'$, so that through the glass the flow of water into the conduit $c$ can be seen, there being a valve $c^4$ above the box, by means of which the rate of flow of the water can be regulated.

Preferably the separator $f$ and the receiving-tank $b$ are located on a floor above that upon which the retorts and the furnace are located, so that the oil and the water will flow by gravity therefrom. An overflow-pipe for the water leads from the separator $f$ to the tank $d$, and it is indicated at $f^2$, being provided with the valve $f^3$, as shown. The tar passes from the separator $f$ through a pipe $h$, which has a plurality of branches $h'$ leading to the fire-boxes of the furnace and the retorts, each of the branches $h'$ communicating with an injector, as shown in Fig. 6. Steam is supplied to said injectors by a pipe $i$, leading from the boiler-furnace and having a series of branch pipes $i'$. The injectors may be formed as desired.

It will be observed that from the pipe $h$ there leads a pipe $h^4$ into the tank $d$, said branch $h^4$ serving as an overflow in case it is not desired to use the tar at any time. In order to blow out the tar-pipes, there is between each pair of pipes $h'$ $i'$ a by-pass $j$, provided with a valve $j'$, and in the pipe $h$ near the separator $f$ there is a check-valve $j^2$.

With this provision it will be seen that any of the branches $h'$ or the pipe $h$ may be blown out by steam from the boiler.

The separator is shown in Figs. 2 to 5. It consists of a casing $k$, having a cover $k'$. With the casing is formed two compartments $k^2$ $k^6$, separated by the wall $k^3$. Above the compartment $k^2$ is placed an inclined screen $k^4$, whose lower edge rests upon or projects over the wall $k^3$. In the side of the compartment $k^2$ there is placed another screen or strainer $k^5$, which is bent into concavo-convex form, as shown in Fig. 5, the pipe $h$ leading from its interior, as shown in Fig. 4. The purpose of this screen is to prevent the flow of foreign matter into the pipe $h$. The pipes $f'$ and $f^2$ communicate with the compartment $k^6$ in the casing, the pipe $f'$ leading from a point near the bottom of said compartment. The end of pipe $g'$ is bent, as at $g^2$, to form a nozzle, which directs the stream of mixed tar and water upon the screen $k^4$ at an obtuse angle thereto. I have discovered that when a mixture of tar and water is directed against the top of the inclined screen of foraminous material the tar will flow through the screen and that the water will be deflected by it and will flow along the plane of the screen and be discharged at its lower end. Consequently by discharging the commingled tar and water upon the screen $k^4$ the tar flows through the meshes thereof into the compartment $k^2$, while the water is deflected into the compartment $k^6$. So far as I have been able to ascertain this is the best mode for separating the water from the oil, and it is my observation that the tar accumulates in the compartment $k^2$ with an even density and of uniform consistency.

According to my invention I am able to secure the steady flow of tar from the box into the tank $d$ and by passing the commingled tar and water through the separator to render the tar in perfect condition for combustion. The water which is separated from the tar may be used over and over again, circulating through the pipe $f'$, the conduit $c$, the tank $d$, the strainer $h^{10}$, the pump $g$, the pipe $g'$, and the separator $f$.

In lieu of the water for flushing the conduit $c$ and removing the tar I may employ thin liquid tar itself. In that event the tar circulates through the pipes constantly, and is thereby prevented from hardening. The constant mixing of the tar by reason of its passing through the pump, the tank, and the separator renders it of a uniform consistency or density, as will be readily understood, so that it may be burned in the furnace and the retorts.

Having thus explained the nature of the invention and described a way of constructing and using the same, although without attempting to set forth all of the forms in which it may be made or all of the modes of its use, I declare that what I claim is—

The process of treating the residuum obtained in the manufacture of gas, which consists in agitating said residuum together with water to reduce it to a liquid mass of uniform consistency, and then separating from said mass the free water to produce a liquid product having a uniform and predetermined consistency.

In testimony whereof I have affixed my signature in presence of two witnesses.

JOHN T. LOWE.

Witnesses:
M. B. MAY,
P. W. PEZZETTI.